Patented Oct. 26, 1954

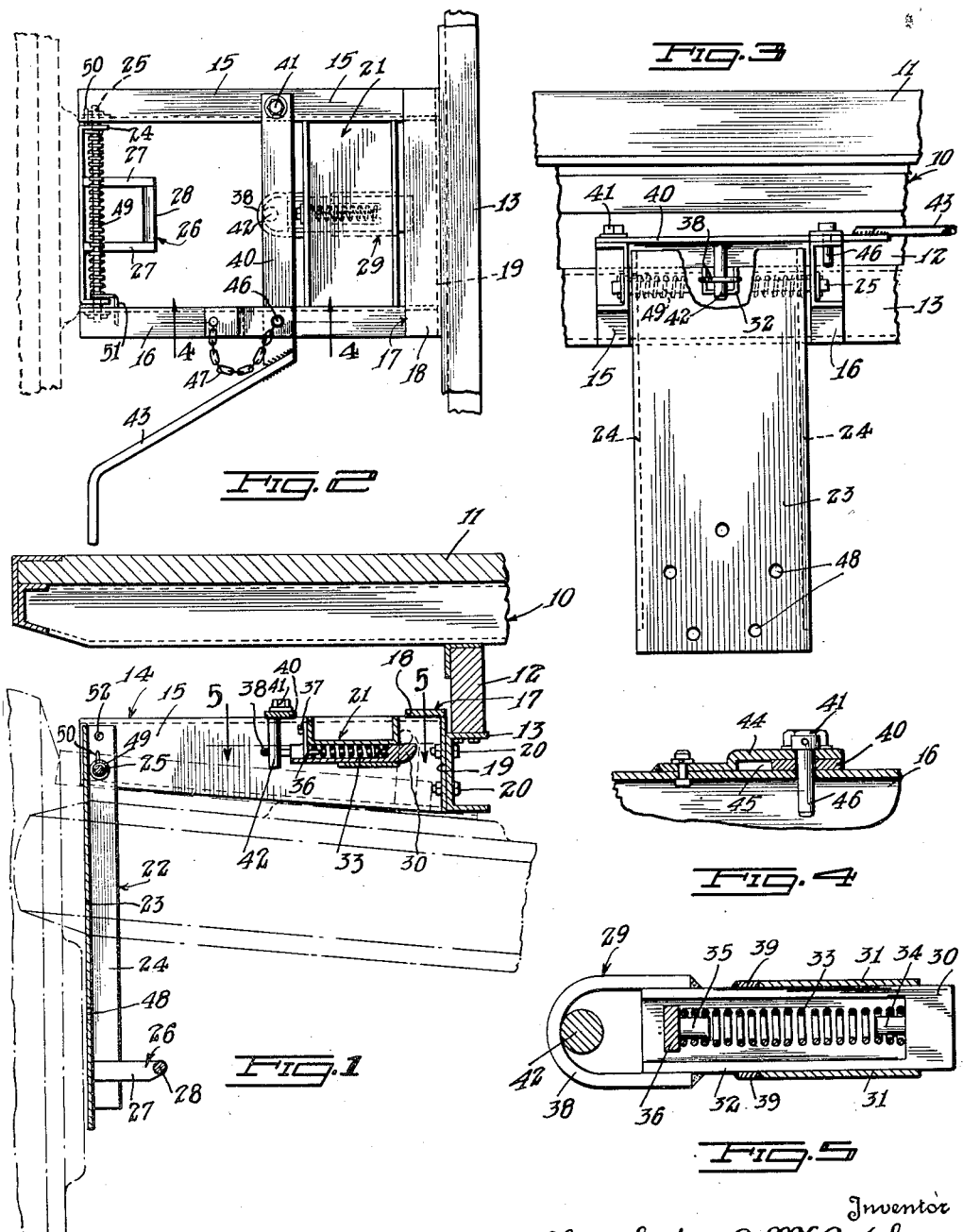

2,692,695

UNITED STATES PATENT OFFICE 2,692,695

TRUCK TIRE AND WHEEL CARRIER

Charleston G. McCarley, Lynwood, Calif.

Application May 4, 1950, Serial No. 159,995

1 Claim. (Cl. 214—454)

This invention relates to a tire and wheel carrier and is particularly directed to improvements and apparatus for carrying a spare wheel and tire upon a vehicle. This invention finds usefulness in connection with the mounting of large truck tires where the weight of the tire and wheel presents a serious problem of handling.

The principal object of this invention is to provide a novel form of mounting device for carrying a spare wheel and tire upon a vehicle.

Another object is to provide a mounting device of this type which positions the wheel and tire under the vehicle in an out-of-the-way position having adequate road clearance and yet which affords easy mounting and dismantling of the wheel and tire with respect to the device.

A further object is to provide a novel form of spare wheel and tire mounting device having a pivotally mounted carrier which may be counterbalanced to promote easy movement of the tire and wheel from installing position to carrying position.

Another object is to provide a carrier for a spare wheel and tire having a novel form of latch and release mechanism for releasably holding the wheel and tire in carrying position against accidental displacement.

Other objects and advantages will appear hereinafter.

In the drawings:

Figure 1 is a fragmentary transverse sectional view showing a portion of a truck body and having a mounting device embodying my invention positioned thereon.

Figure 2 is a plan view of the device shown in Figure 1, the upper portion of the truck body being omitted for clarity of illustration.

Figure 3 is an end elevation of the device shown in Figure 1.

Figure 4 is a sectional elevation taken substantially on the lines 4—4 as shown in Figure 2.

Figure 5 is a sectional plan view taken substantially on the lines 5—5 as shown in Figure 1.

Referring to the drawings, the truck body generally designated 10 may include a bed 11, a spacer 12 and a metal frame 13. The body 10 may be supported on pneumatic tired wheels in any conventional manner.

In accordance with my invention, a mounting device 14 is attached to the metal frame 13 in a position under the bed 11. The mounting device 14 may comprise a pair of spaced side rails 15 and 16 joined at their inner ends by an angle section 17 having a top flange 18 and a side flange 19. Releasable bolts 20 may serve to connect the side flange 19 to the metal frame 13, thereby serving to fasten the mounting device 14 on the frame of the truck. A U-shaped channel member 21 also extends between the side rails 15 and 16 and serves as a stiffener therefor. The side rails 15 and 16, angle section 17 and channel 21 may be joined by any convenient means such as, for example, by welding.

A swinging arm 22 provided with a front plate 23 and edge flanges 24 may be pivotally mounted on the outer ends of the side arms 15 and 16. Thus, a pivot pin 25 may extend through both of the side arms and through the flanges 24 on the arm 22.

A latch lug 26 comprising a pair of spaced projections 27 connected by crossbar 28 may be carried on the swinging arm 22 near its lower end. A latching device generally designated 29 is mounted on the channel 21 and adapted for releasable engagement with the crossbar 28 of the latch lug 26. The latching device 29 includes a sliding latch member 30 mounted for sliding movement relative to the underside of the channel 21 and guide 31 carried thereby. The latch member 30 may have a U-shaped extension portion 32, and a compresison spring 33 may be mounted within the central hollow portion of this U-shaped extension. One end of the spring is guided on a central pin 34 carried on the latch member 30, and the other end is guided on a pin 35 carried at the lower end of the downwardly extending abutment piece 36. The abutment piece 36 may be removably secured to the channel 21 by means of the bolt 37. A loop or bail 38 is secured to the latching member 30 by any convenient means such as by welding. Stop lugs 39 may be mounted on the latching member at a position intermediate the guide 31 and bail 38 in order to limit the travel of the latching member 30 in both directions. From the above description it will be understood that the compression spring 33 normally acts against the relatively stationary abutment piece 36 to cause the latching member 30 to move toward the right, as viewed in Figure 5, and movement of the latch in a direction to compress the spring 33 is accomplished by movement of the bail 38 toward the left.

Means are provided for releasing the latch mechanism 29, and as shown in the drawings this includes an arm 40 pivotally connected to the side rail 15 by means of the pivot pin 41. The arm extends transversely between the side rails 15 and 16 and carries a downwardly extending pin 42 which extends into the opening of the bail 38.

An actuating handle 43 may be secured to the arm 40 as by welding and extended outwardly to a position of convenient access. A guide bracket 44 may be secured to the side rail 16, and this bracket is adapted to provide a slot 45 for reception of the arm 40. A locking pin 46 may be passed through aligned holes drilled in the bracket 44, arm 40 and side rail 16 in order to prevent accidental displacement of the arm 40. The pin 46 may be attached to the side rail 16 by means of a chain 47 if desired.

A wheel and tire may be removably secured to the swinging arm 22 in any convenient fashion. I prefer to provide a plurality of apertures 48 in the plate 23 corresponding to the spacing of the wheel lugs provided on the wheels of the vehicle. Bolts (not shown) may be passed through these apertures to connect the spare wheel and tire to the swinging arm 23 as will be readily understood. The tire may be mounted while the arm is in installing position; that is, in the position shown in heavy lines in Figure 1, and may be swung then to carrying position as indicated by the dotted lines in Figure 1. Very large truck tires are so heavy that it may be desirable to counterbalance a portion of this weight in order that the wheel and tire may be easily swung by one man from loading position to carrying position. As shown in the drawings, this means includes a torsion spring 49 fixed at one end 50 to one of the flanges 24 of the swinging arm 22 and fixed at its other end 51 to the side rail 16. Openings 52 may be provided in the upper end of the swinging arm 22 and in one of the side rails and positioned so that the openings are brought into alignment when the swinging arm 22 is in loading position. A pin (not shown) may be provided for extending through the aligned openings 52 to maintain the swinging arm 22 in position against the force of the tension spring 49, in order that the mounting of the wheel and tire on the arm 22 may be facilitated.

In operation the wheel and tire are normally carried on the swinging arm 22 in an out-of-the-way position under the truck bed, as shown by the dotted lines in Figure 1. In this position the latch member 30 engages under the latching lug 26 to maintain the swinging arm 22 in its carrying position. Should it be desired to remove the spare wheel and tire for active service the locking pin 46 is withdrawn, and the handle 43 is pulled manually to swing the arm 40 in a clockwise direction about the pin 41, as viewed in Figure 2. This movement of the arm 40 causes the pin 42 to engage the bail 38 and thereby retract the latching member 30. The swinging arm 22 and the tire and wheel connected thereto then swing downwardly by gravity about the pivot 25 against the action of the torsion spring 49. The swinging arm 22 may be releasably latched in its vertical or loading position by inserting a pin in the aligned openings 52. The tire and wheel may be withdrawn then by removal of the bolts extending through the apertures 48.

It will be understood that any other preferred form of detachable mounting for the wheel on the swinging arm 22 may be employed if desired.

Having fully described my invention, it is to be understood that I do not wish to be limited to the details herein set forth, but my invention is of the full scope of the appended claim.

I claim:

In a carrier device for supporting a tire assembly in a position beneath the bed of a load carrying vehicle, the combination of: a laterally extending supporting member; attaching means for securing one end of the supporting member to the vehicle; a pivotal support on the supporting member near the other end thereof; a swinging arm suspended on the pivotal support for movement between a substantially vertical loading position and a carrying position in which it extends from the pivotal support under the bed of the vehicle toward said attaching means; means whereby a tire assembly may be secured to the swinging arm on a side thereof remote from said attaching means; releasable latch means carried on the supporting member and adapted to maintain the swinging arm and tire assembly in said carrying position; means for releasing the latch means including a releasing lever pivotally mounted on the supporting member; and a torsion spring associated with the pivotal support and acting to move the swinging arm toward carrying position and thereby partially counterbalance the weight of the tire assembly.

References Cited in the file of this patent

UNITED STATES PATENTS

| Number | Name | Date |
| --- | --- | --- |
| Re. 22,928 | Sargent et al. | Oct. 14, 1947 |
| 1,813,094 | Appel | July 7, 1931 |
| 1,895,024 | Coquille | Jan. 24, 1933 |
| 2,052,970 | Erbeck | Sept. 1, 1936 |